United States Patent [19]

Jastrzebski et al.

[11] Patent Number: 4,642,565
[45] Date of Patent: Feb. 10, 1987

[54] METHOD TO DETERMINE THE CRYSTALLINE PROPERTIES OF AN INTERFACE OF TWO MATERIALS BY PHOTOVOLTAGE PHENOMENON

[75] Inventors: Lubomir L. Jastrzebski, Plainsboro, N.J.; Jacek Lagowski, Wobum, Mass.

[73] Assignee: RCA Corporation, Princeton, N.J.

[21] Appl. No.: 666,192

[22] Filed: Oct. 29, 1984

[51] Int. Cl.⁴ ............................................. G01R 31/26
[52] U.S. Cl. ............................ 324/158 R; 324/158 D
[58] Field of Search .......... 324/158 D, 158 R, 158 T, 324/73 R; 356/357; 250/358.1

[56] References Cited

U.S. PATENT DOCUMENTS 4,333,051  6/1982  Goodman .................. 324/158 R
4,352,016  9/1982  Duffy et al. ................ 250/358.1
4,352,017  9/1982  Duffy et al. ................ 250/358.1

OTHER PUBLICATIONS

Goodman, A. M.; "Silicon-Wafer-Surface . . ."; J. Appl. Phy.; 53(11); Nov. 1982, pp. 7561–7565.

*Primary Examiner*—Ernest F. Karlsen
*Attorney, Agent, or Firm*—B. E. Morris; D. S. Cohen; B. F. Plantz

[57] ABSTRACT

Crystalline quality of a semiconductor material near its interface with an insulator is evaluated by the photovoltage response to a light beam scanned in wavelength. The crystalline quality is determined from the photovoltage interference pattern in the region of intrinsic excitation of the material. A body of silicon-on-sapphire (SOS) is used to illustrate the method.

9 Claims, 12 Drawing Figures

{ 4,642,565 }

METHOD TO DETERMINE THE CRYSTALLINE PROPERTIES OF AN INTERFACE OF TWO MATERIALS BY PHOTOVOLTAGE PHENOMENON

This invention relates to a method for determining the crystalline quality of the interface of two materials and, more particularly, for determining the crystalline quality of a silicon-on-sapphire (SOS) interface by photovoltage phenomenon.

BACKGROUND OF THE INVENTION

Silicon-on-sapphire (SOS) plays an important role as material especially suited for radiation-hard integrated circuits using complimentary metal oxide semiconductors (CMOS). The SOS technology has also been considered as a potential contributor to high performance very large scale integrated (VLSI) and very high scale integrated (VHSI) circuit applications. Recent work on SOS devices has clearly demonstrated a direct relationship between the crystalline perfection of SOS films and device parameters. It has also been shown that crystalline imperfections have a detrimental effect on electronic properties of SOS films, such as excess carrier lifetime, trapping centers, degree of amorphization and microscopic electrical inhomogeneities.

The pace of the optimization of the properties of materials in the heteroepitaxial silicon technology is closely related to the ability to characterize the quality of the deposits. The entire thickness of the film can be observed by cross-section transmission microscopy, but this method is laborious and time consuming, and therefore cannot serve as a rapid feed-back for material optimization efforts. UV reflectometry now serves as a rapid method to characterize the crystalline quality of the heteroepitaxial silicon surface most remote from the silicon/sapphire interface. See U.S. Pat. Nos. 4,352,016 and 4,352,017 issued on Sept. 22, 1982 to M. L. Duffy, et al. for a description of the use of UV reflectivity for determining the quality of silicon layers.

One method for the characterization of the crystalline nature of the silicon near or at the silicon/sapphire interface is described in our co-pending application Ser. No. 439,562 filed Nov. 5, 1982, now U.S. Pat. No. 4,498,772, issued Feb. 12, 1985, entitled "Method to Determine the Crystalline Properties of an Interface of Two Materials by an Optical Technique." According to that method, we utilize interference reflectivity phenomenon generated between the silicon/sapphire interface and measure reflections from the illuminated silicon surface. The measured reflections are used to determine the refractive index of the silicon at or near the interface which is a measure of the crystalline quality of the silicon. The index of refraction of the silicon in bulk form is different from the index of refraction of a thin film of silicon, particularly at or near the interface with sapphire.

We have now discovered that the crystalline quality of the silicon/sapphire interface can be characterized by photovoltage phenomenon. See U.S. Pat. No. 4,333,051, entitled "Method and Apparatus for Determining Minority Carrier Diffusion Length in Semiconductors," issued on June 1, 1982 to A. M. Goodman, for a description of using surface photovoltage phenomena to determine crystalline quality in terms of the minority carrier diffusion length. See also, U.S. patent application Ser. No. 619,368 of J. I. Pankove, et al. filed June 11, 1984, entitled "Method and Apparatus for Generating a Map Indicating the Quality of Semiconductor Material," for a description of using single wavelength surface photovoltage measurements directly to provide a map indication of the quality of the body of semiconductor material.

SUMMARY OF THE INVENTION

According to the method of the present invention, the photovoltage signals of one material are related to the crystalline quality of the layer of material, such as silicon, on a substrate of material of a different crystalline quality, such as sapphire.

The method comprises exposing the surface of a semiconductor material layer on an insulating material substrate to a monochromatic light beam scanned sequentially in wavelength to provide a photovoltage signal having an intensity which oscillates as a function of light energy and which is generated by interference reflections between the surface and the interface with the substrate; measuring the intensity of the photovoltage signals to obtain a series of wavelength related intensity signals; determining extrema from the intensity signals; and determining from the extrema the crystalline quality of the semiconductor material at or near the interface.

DETAILED DESCRIPTION OF THE PREFERRED EMBODIMENT

Figure 1:
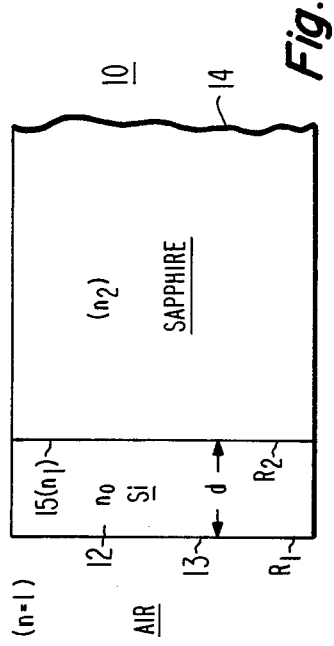
FIG. 1 is a schematic of a body of semiconductor material (SOS) illustrating the optical properties of the body.

A semiconductor body 10 useful in practicing the method of the invention is illustrated in FIG. 1. Body 10 is formed of an insulating substrate 14 upon which is deposited a layer of semiconductor material 12 with a thickness d. While the invention can be practiced on any semiconductor material deposited on an insulator, the present embodiment will be described with reference to a semiconductor body 10 formed of a sapphire substrate 14 on which a layer 12 of silicon on the order of 0.1 to 1.0 micrometer (μm) is deposited. The refractive index of the sapphire is $n_2$. The refractive index for the bulk portion of the silicon film 12 is $n_o$. The refractive index for the ambient air is unity. The reflection coefficients $R_1$ and $R_2$, respectively, are related to the surface 13 of the layer 12 and the interface 15 of the layer 12 and substrate 14.

The refractive index at or near the interface 15 is $n_1$. The index $n_1$ is different from the bulk index $n_o$. The determination of the index $n_1$ is one characterization of the crystalline quality of the interface as taught by our copending U.S. patent application Ser. No. 439,562 now U.S. Pat. No. 4,498,772 issued Feb. 12, 1985, identified above.

Monochromatic light is scanned in selected wavelengths to provide a substantially continuous beam of light varying in wavelength within a predetermined optical spectrum, for example, 0.1 to 1.0 μm. This wavelength-scanned light is used in the measurements by illuminating the surface 13 of the semiconductor material 12.

Figure 2:
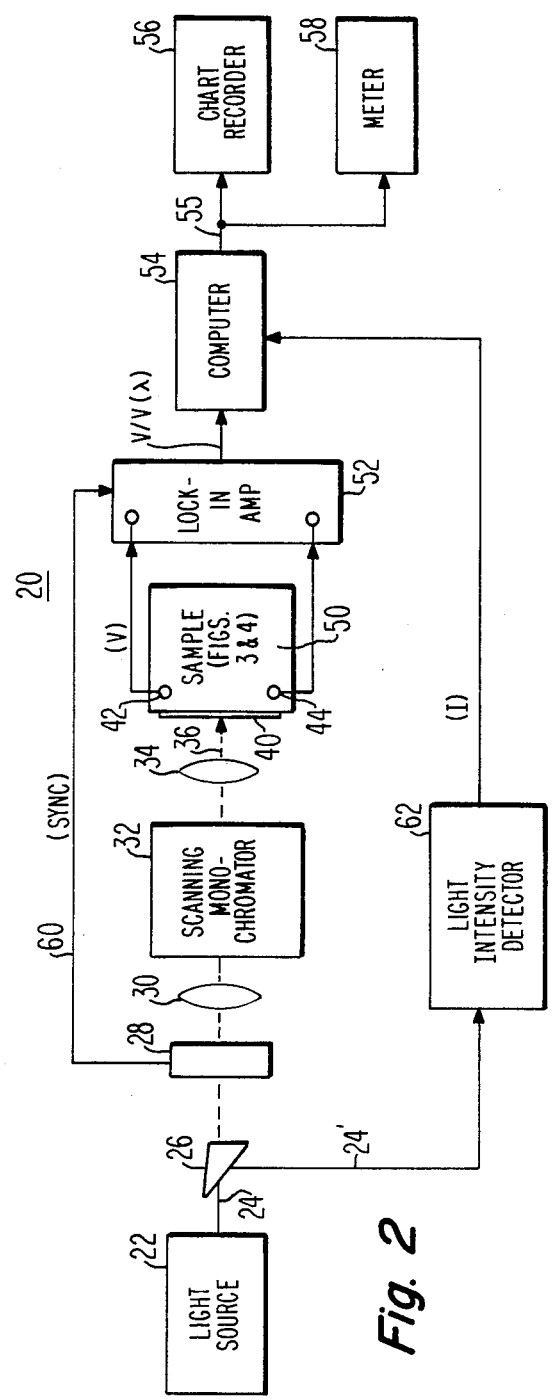
FIG. 2 is a block schematic of a system for making photovoltage measurements on the body of semiconductor material illustrated in FIG. 1 for determining the electronic properties thereof.
Figure 3:
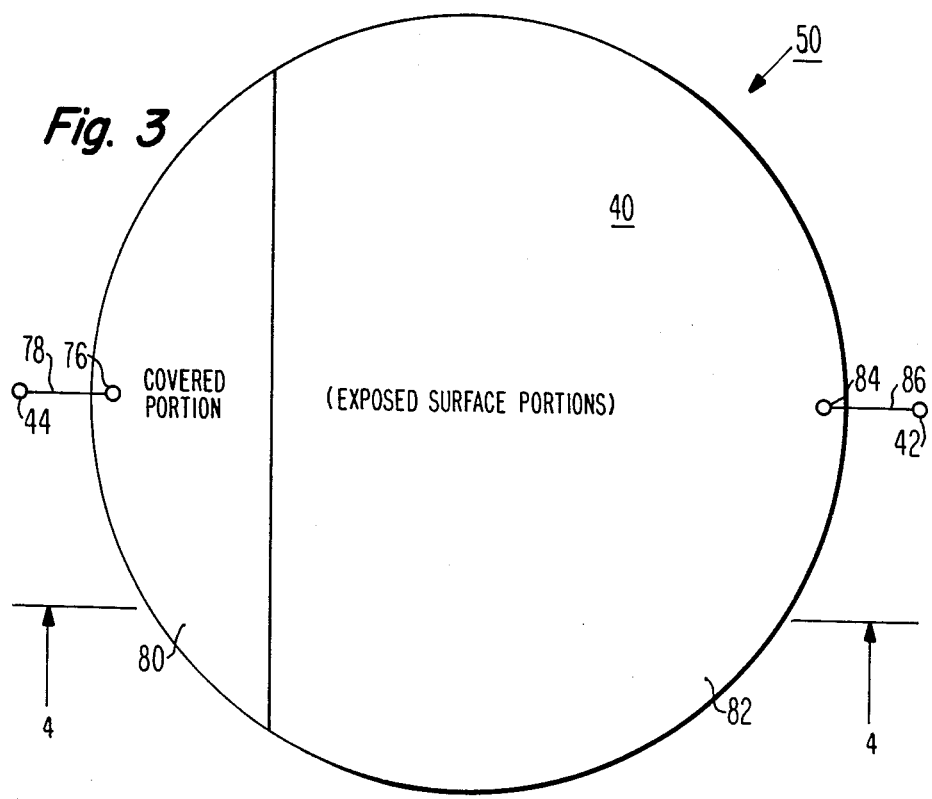
FIG. 3 is a plan view of one form of an SOS device used in the practice of the invention.
Figure 4:
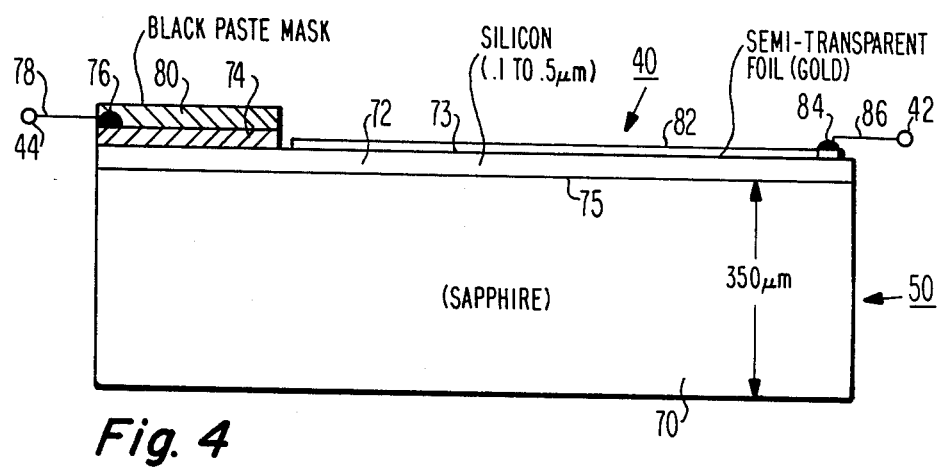
FIG. 4 is a section in elevation of FIG. 3 as seen along viewing line 4—4.

Reference is now made to FIG. 2 illustrating, in a block schematic form, a system 20 for making the measurements on the body 10 of semiconductor material illustrated in FIG. 1, the practical form of which is shown in FIGS. 3 and 4 to be described. Light source 22 provides a beam 24 of polychromatic light to a beam splitter 26 and thence to a light chopper 28 through a collimating lense 30 to a scanning monochromator 32. The monochromator 32 is operated to provide a selected wavelength for each measurement step. A focusing lens 34 provides a beam 36 of focused light to the surface 40 of a sample device 50 illustrated in FIGS. 3 and 4. A photovoltage signal responsive to the light beam 36 provides a voltage via terminals 42 and 44 to a lock-in amplifier 52. The output of lock-in amplifier 52 is applied to one input of a computer 54 which in turn provides output signals to a chart recorder 56 and a meter 58.

The light chopper 28 is operated in this embodiment at a frequency of 19 Hertz providing a synchronization control signal via path 60 to the lock-in amplifier 52 for synchronization and detection purposes.

The light beam 24 from light source 22 is split by beam splitter 26 and applied as a beam 24' to a light intensity detector 62. Detector 62, responsive to beam 24', provides a light intensity current signal I which is applied to the computer 54. Computer 54, responsive to the voltage input V and the current signal input I, provides an output signal on path 55 used in the measurements made according to the present invention, as will be described in detail hereinafter.

Reference is now made to FIGS. 3 and 4 illustrating in plan and sectional view a device 50 used as a test sample to make the measurements according to the present invention. The device 50 is formed of a substrate 70 of sapphire upon which is deposited a thin film 72 of silicon. The silicon will have thicknesses in the range of 0.1 to 0.5 μm. A portion of the film 72 is provided with a metalized surface film 74 suitably formed of aluminum which forms ohmic contact to film 72. A terminal 76 connected to the film 72 provides electrical access by a conductor 78 to the terminal 44 described above in connection with FIG. 2. The metalized film 74 is provided with an opaque surface, such as a black paste mask 80, to prevent light from reaching the film 74. A semi-transparent metallic film 82, suitably formed of gold, is deposited by evaporation of the film 82 on the silicon film 72. Moreover, film 82 is spaced from film 74 to electrically isolate each film from the other. The film 82 forms a Schottky barrier with the film 72. A terminal 84 on the film 82 provides an electrical connection via conductor 86 to the terminal 42 described above in connection with FIG. 2.

Device 50, as described, functions itself as a photodetector needed to provide the signals for measurements according to the present invention. The foil 82 with the film 72 of silicon serves as the rectifying junction of a photodetector. In the operation of the device for the tests and measurements that are made, the sample device 50 is placed on a cold finger of a cryostat operated with liquid nitrogen to provide the low temperatures that may be used in the measurements if desired.

Figure 6:
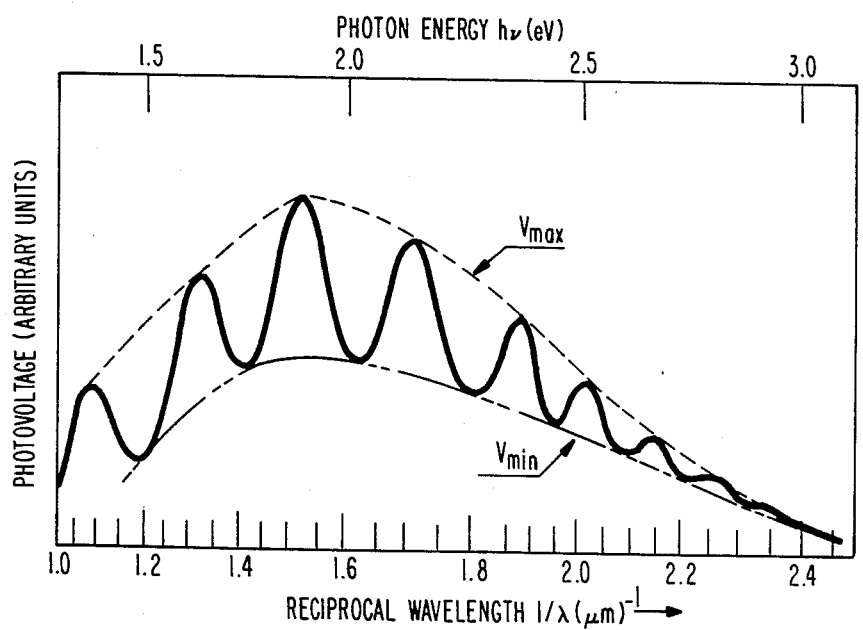
FIGS. 6 through 12 are experimental plots of the minima and maxima photovoltage as a function of the reciprocal of wavelength.

The photovoltage spectra of silicon-on-sapphire devices exhibit a characteristic interference pattern in the region of intrinsic excitation. This intrinsic excitation exists where $H\nu > E_g$, where H is the Planck constant and $\nu$ is the frequency. $H\nu$, therefore, is the photon energy which is slightly larger than the bandgap voltage $E_g$ of the silicon. Such a pattern consists of a series of maxima and minima excursions of photovoltage which are due to the interference of the light reflected from the front surface 73 (FIG. 4) and the interface 75 between the silicon film 72 and the sapphire substrate 70. Such a typical photovoltage oscillation within the film 72 in response to the excitation light beam 36 (FIG. 2) provides a photovoltage of the form illustrated in FIG. 6. The interference pattern shown in FIG. 6 is representative of typical photovoltage oscillations. A preferred reciprocal wavelength of the optical specimen of light is within the range of 1.0 to 2.5 μm$^{-1}$ which is derived from wavelengths within the range of 0.5 to 1.0 μm. The film 72 of silicon used to develop the spectra of FIG. 6 which has a thickness of 0.6 μm. A preferred thickness of the film 72 is within the range of 0.1 to 1.0 μm.

For an analysis of the magnitude of the photovoltage oscillations, that is, the magnitude of the ratio of the maximum voltage $V_{max}$ and the minimum voltage $V_{min}$, it is convenient to introduce a parameter Δ which is defined as follows:

$$\Delta = \left( \frac{V_{max}}{V_{min}} \right)^{1/p} \qquad (1)$$

where $V_{max}$ and $V_{min}$ are the respective envelopes of the oscillating signal, as illustrated in FIG. 6; Δ is a parameter representing the crystalline quality of the material as will be further described, and p is a parameter which defines the power dependence of the photovoltage (V) on the illumination intensity I. Accordingly, the photovoltage (V) is proportional to $I^p$.

We have discovered that if the parameter p is made to have a value of 1, the ratio of $V_{max}$ to $V_{min}$, which is the magnitude of the ratio of the photovoltage oscillations extrema, is a linear relationship defining the crystalline quality parameter Δ.

Figure 5:
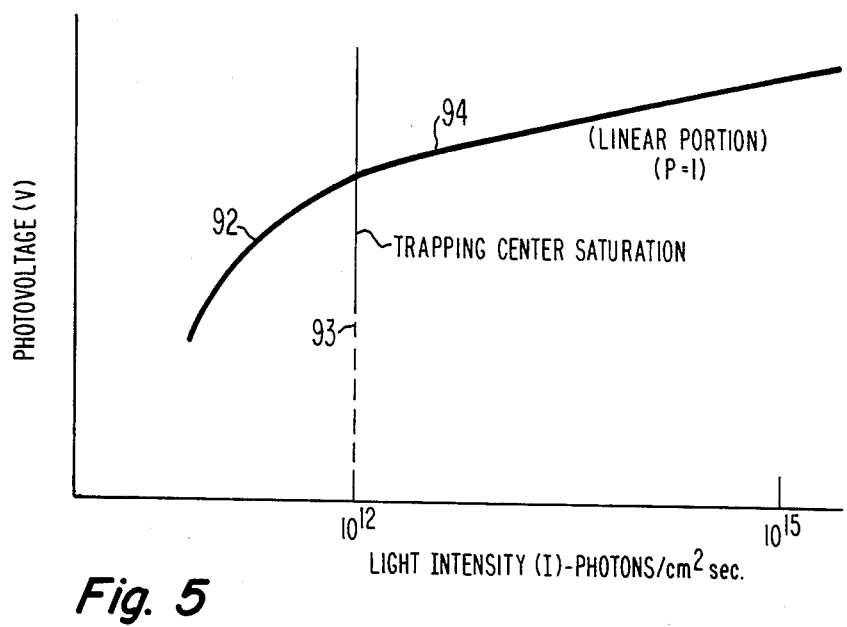
FIG. 5 is a plot of photovoltage (V) versus light intensity (I) used to determine the saturation of the trapping centers.

Before proceeding with a test measurement of the sample 50, the sample 50 is saturated with sufficient light to provide a linear response of detected photovoltage to light intensity. A linear response will be provided once the trapping centers in the layer 72 are saturated. Reference is made to FIG. 5 illustrating a characteristic response curve of photovoltage (V) to light intensity (I). The curve portion 92 for relatively weak light intensity values (I) in the range of below $10^{12}$ photons/cm$^2$-sec will provide photovoltages that are nonlinearly related to the photovoltage (V) as, for example, along curve portion 92. However, at values of about $10^{12}$ to $10^{15}$ photons/cm$^2$sec, the trapping centers within the silicon layer of film 72, particularly in the vicinity of the interface 75, become saturated and, thereafter, the response of intensity (I) to photovoltage (V) is linear, as indicated by the curve portion 94.

We have discovered that within the linear portion 94, the parameter p of equation (1) is equal to unity. This saturation threshold is indicated by the vertical dotted line 93 on the plot of FIG. 5. Accordingly, the apparatus 20, when used to measure a device 50, is initially operated to determine the light intensity value for saturating the trapping centers as follows: The light source 22 is operated to provide a light intensity signal I to computer 54, which, in turn, responds to the voltage signal V generated at any selected wavelength. The computer 54 is arranged to provide a photovoltage (V) versus intensity (I) output at the meter 58 or chart recorder 56 to indicate the saturation of the trapping centers as shown in FIG. 5. Thereafter, the intensity (I) of the light source 22 is maintained at that predetermined value for the subsequent measurements.

The method of the invention is carried out by positioning a sample of the device 50 in the path of the focused light beam 36 to a selected wavelength. The intensity (I) of the light is adjusted to saturate the trapping centers of the material in the film 72. At this value of intensity (I), the value of p in equation (1) is 1.0 for an ambient of 300° K. or greater. At 220° K., the value of p for the same intensity (I) is 0.3. The beam 36 is scanned sequentially in wavelength by the monochromator 32. At each wavelength, the photovoltage (V) is measured by the computer 54. Computer 54 determines from the measurements the photovoltage extrema. The ratio of the extrema is calculated by the computer 54 using equation (1) to determine the crystalline quality parameter Δ.

Figure 7:
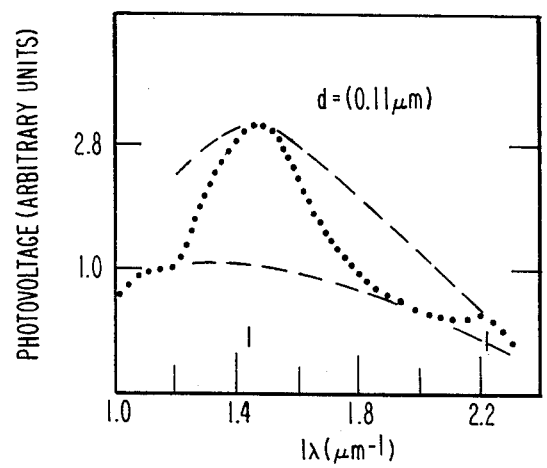
Figure 8:
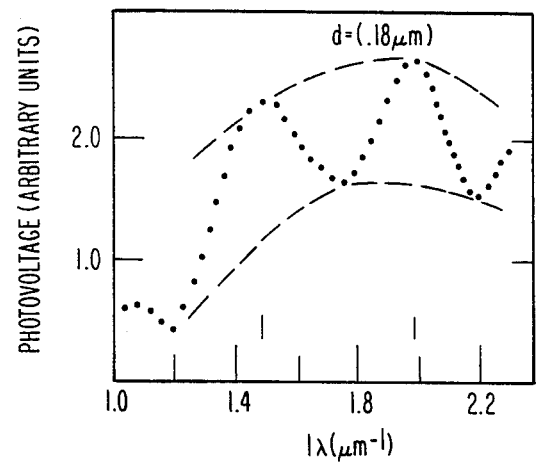
Figure 9:
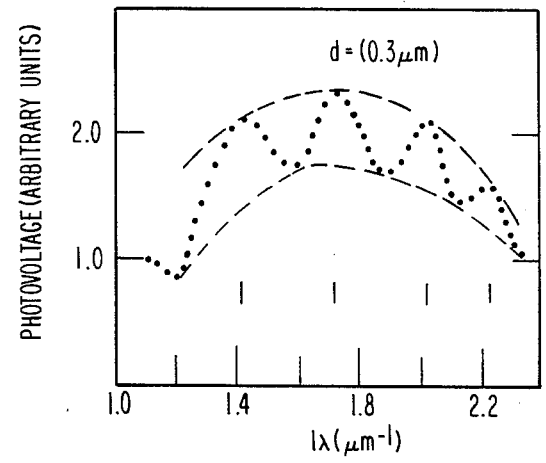
Figure 10:
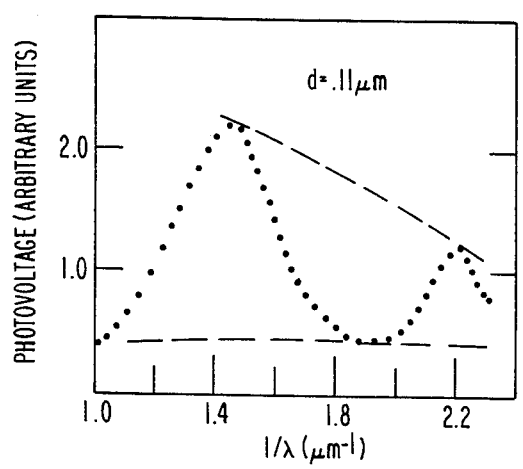
Figure 11:
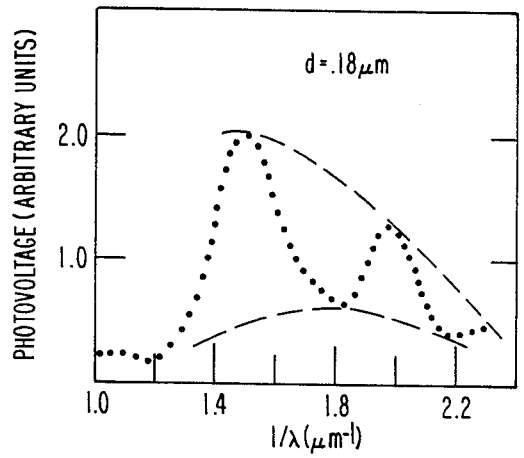
Figure 12:
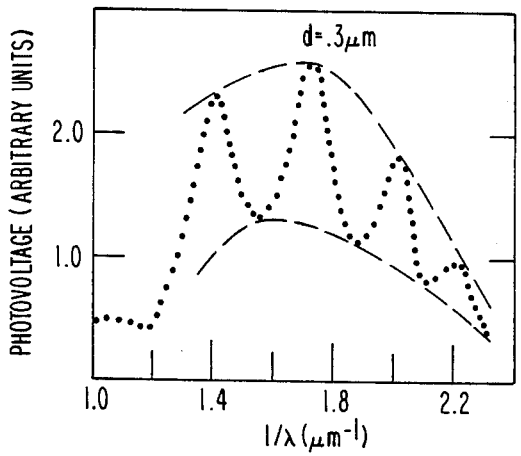

FIGS. 7, 8 and 9 represent the photovoltage spectra resulting from three specimen films of silicon of thicknesses 0.11, 0.186, and 0.30 μm, respectively. The measurements were made on a device 50 with the designated film thicknesses at a temperature of 220° K. The value of p is 0.3 at this temperature. Similar measurements were made for the same respective devices at a room temperature of 300° K., as shown by FIGS. 10, 11 and 12. At 300° K., the value of p is 1.0. It is noted that the light intensity (I) is the same at 220° K. and 300° K. A study of the photovoltage spectra of FIGS. 7, 8, 9, 10, 11 and 12 shows that the amplitude of the photovoltage oscillation amplitudes (as a function of the photon energy as well as the reciprocal of the wavelength 1/λ) increase with decreasing film thickness. A table of comparative values to be presented hereinafter will make this relationship clear.

The experimental observation that the ratio of $V_{max}/V_{min}$ increases with decreasing film thickness is significant. It reveals that the photovoltage (V) is sensitive to the phenomenon occurring at the interface 75 (FIG. 4). We have discovered that the best operating conditions for probing the interface 75 by the method of the invention occurs at room temperature (300° K.) or slightly elevated above that temperature at which the magnitude of the oscillations is the highest. We believe that this effect is due to a decreased excess carrier trapping at higher temperatures and to a corresponding enhancement of the relationship of photovoltage (V) and light intensity (I) relationship to the parameter p approaching the value of 1. This was mentioned in the description of the curve plot illustrated in FIG. 5.

Even though the preferred form of the invention utilizes the value of p equal to 1, namely, where the saturation of the trapping centers has been established, we have discovered that at low temperatures, on the order of 220° K., the value of p is about 0.3 for the same light intensity used at both temperatures as mentioned above. Such a strong deviation from linearity as seen by the curve portion 92, for example, is responsible for the decreasing values of $V_{max}/V_{min}$ that we have observed at lower temperatures. The following table gives a comparison between the value of $V_{max}/V_{min}$ at the temperatures of 300° K. and 220° K.

TABLE

| Film Thickness (μm) | Determined Values of $V_{max}/V_{min}$ | | | |
|---|---|---|---|---|
| | Good Crystalline Quality | | Poor Crystalline Quality | |
| | 300° K. | 220° K. | 300° K. | 220° K. |
| 0.3 | 2.0 | 1.4 | 4.1 | 1.2 |
| 0.18 | 2.7 | 1.6 | | |
| 0.11 | 3.5 | 2.3 | 10 | 2.5 |

The effect of film thickness on the ratio of $V_{max}/V_{min}$ is apparent from the results listed in the table for both temperatures even though the magnitude of the changes in the film thickness is reduced at low temperatures due to trapping effects, as we have explained above. We have also discovered that these results occur for constant values of the average film refractive index as determined by the process described in our above-identified patent application Ser. No. 439,562, now U.S. Pat. No. 4,498,772 issued Feb. 12, 1985.

Based on these studies, we have snown that the effect of utilizing photovoltage interference phenomenon is related to the silicon/sapphire interface 75.

Experiments were performed to compare the results of the method of the present invention to the results on the same sample device 50 determined by the UV reflectometry method described in the above-identified U.S. Pat. Nos. 4,352,016 and 4,352,017. We found good correlation in the identification of what we have identified in the Table as good quality and poor quality crystalline material.

What is claimed is:

1. A method for determining the crystalline quality of a crystalline lattice of one material near an interface between said one material and a different material of different crystalline lattice, said one material (1) having a surface comprising an exposed surface portion opposed to said interface and an unexposed surface portion in coplanar relation with said exposed surface portion and opposed to said interface, (2) having negligible absorption in a given optical spectrum, and (3) having a known reflection coefficient at said exposed surface portion; said exposed surface portion having a semitransparent electrode thereover and said unexposed surface portion having an ohmic contact thereto, comprising the steps of:

(a) exposing said exposed surface portion to a light beam having a selected wavelength;

(b) varying the intensity of said light beam to a value to be sufficient to saturate the trapping centers of said one material;

(c) exposing said exposed surface portion to said light beam at said intensity and scanned sequentially with wavelengths having values within said optical spectrum whereby light reflected between said interface and said exposed surface portion oscillates in intensity between extrema as a result of interference reflections between said exposed surface portion and said interface manifesting a corresponding photovoltage signal oscillation;

(d) measuring the photovoltage signals appearing between said exposed surface portion and said unexposed surface portion at each respective wavelength to obtain a series of photovoltage signals corresponding to each wavelength;

(e) determining from said photovoltage signals the photovoltage extrema; and (f) determining from said photovoltage extrema the crystalline quality of said one material near said interface, the smaller the ratio of said photovoltage extrema the better the crystalline quality of said material near said interface.

2. The method of claim 1 comprising the step of selecting said one material to be essentially monocrystalline silicon and said different material to be sapphire.

3. The method according to claim 1 comprising the step of selecting the wavelength of said optical spectrum of light to be within the range of 0.5 to 1.0 micrometer.

4. The method according to claim 1 wherein the step of selecting the thickness of said one material to be on the order of 0.1 to 1.0 micrometer.

5. The method of claim 1 wherein said intensity varying step comprises sensing the light intensity of said light beam as a function of the photovoltage signal measured at said exposed surface portion, the deep trap saturation being manifested where the plot of said photovoltage versus said light intensity becomes linear.

6. The method of claim 1 wherein said photovoltage extrema is represented by the following relationship:

$$\Delta = \left( \frac{V_{max}}{V_{min}} \right)^{1/p}$$

where $V_{max}$ and $V_{min}$ are the maximum and minimum photovoltage, p is an exponent that is proportional to the intensity of light and $\Delta$ is a parameter indicative of the crystalline quality of said one material.

7. The method of claim 6 wherein the value of p is selected to be substantially unity by saturating the deep traps of said one material.

8. The method of claim 1 wherein the ratio of the magnitude of the extrema increases as the thickness of said one material decreases.

9. The method of claim 1 wherein the larger the ratio of the magnitude of the extrema the poorer the crystalline quality of said one material near said interface.

* * * * *